United States Patent
Tsai et al.

(10) Patent No.: US 9,322,971 B2
(45) Date of Patent: Apr. 26, 2016

(54) ILLUMINATION APPARATUS, METHOD FOR MANUFACTURING LIGHT GUIDE PLATE, BACK LIGHT MODULE AND METHOD FOR MANUFACTURING THE SAME

(71) Applicant: Global Lighting Technologies Inc., Taoyuan (TW)

(72) Inventors: Chung-Lin Tsai, Taoyuan (TW); Ching-Ling Wang, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 0 days.

(21) Appl. No.: 14/606,031

(22) Filed: Jan. 27, 2015

(65) Prior Publication Data

US 2015/0131323 A1 May 14, 2015

Related U.S. Application Data

(63) Continuation-in-part of application No. 13/911,102, filed on Jun. 6, 2013, now Pat. No. 9,004,737, which is a continuation-in-part of application No. 13/172,882, filed on Jun. 30, 2011, now Pat. No. 8,480,286, which is a continuation-in-part of application No. 12/464,104, filed on May 12, 2009, now Pat. No. 7,997,784.

(51) Int. Cl.
*F21V 7/04* (2006.01)
*F21V 8/00* (2006.01)
*B29D 11/00* (2006.01)
*B29K 101/12* (2006.01)

(52) U.S. Cl.
CPC ........ *G02B 6/0021* (2013.01); *B29D 11/00663* (2013.01); *G02B 6/0065* (2013.01); *G02B 6/0068* (2013.01); *G02B 6/0083* (2013.01); *G02B 6/0085* (2013.01); *B29K 2101/12* (2013.01); *B29K 2995/0026* (2013.01); *G02B 6/0073* (2013.01)

(58) Field of Classification Search
CPC .. G02B 6/0021; G02B 6/0083; G02B 6/0068; G02B 6/0085; G02B 6/0065; G02B 6/0073; B29D 11/0663; B29K 2101/12; B29K 2995/0026
See application file for complete search history.

(56) References Cited

U.S. PATENT DOCUMENTS

| 7,991,257 B1 * | 8/2011 | Coleman | B29D 11/0073 264/1.24 |
| 9,244,212 B2 * | 1/2016 | Holman | G02B 6/0061 |
| 2010/0014316 A1 * | 1/2010 | Yue | G02B 6/0036 362/619 |
| 2010/0110673 A1 * | 5/2010 | Bergman | G02B 6/0045 362/231 |

(Continued)

*Primary Examiner* — Donald Raleigh
(74) *Attorney, Agent, or Firm* — Jianq Chyun IP Office

(57) ABSTRACT

A method for manufacturing a light guide apparatus includes the following steps. A first mold and a second mold are provided. The first mold and the second mold respectively include a first molding surface and a second molding surface facing each other. A protrusion is disposed at the first or second molding surfaces. Sheet materials are provided. Each sheet material includes an opening corresponding to the protrusion, a first surface and a circuit layer disposed on the first surface. One of the sheet materials is disposed on the first mold with first surface facing the first mold. The first mold and the second mold are closed. An optical plastic material is injected into the space between the first and second molding surfaces to form a light guide plate having a via corresponding to the protrusion for embedding a light source. The sheet material is laminated on the light guide plate.

18 Claims, 9 Drawing Sheets

(56) References Cited

U.S. PATENT DOCUMENTS

| | | | | |
|---|---|---|---|---|
| 2010/0315833 A1* | 12/2010 | Holman | ............... | G02B 6/0028 362/607 |
| 2011/0175533 A1* | 7/2011 | Holman | ................... | E04B 9/32 315/130 |
| 2012/0281432 A1* | 11/2012 | Parker | .................. | F21V 29/004 362/609 |
| 2012/0294037 A1* | 11/2012 | Holman | ................... | F21V 5/02 362/609 |
| 2013/0279197 A1* | 10/2013 | Holman | ................ | F21V 7/0058 362/613 |
| 2014/0153282 A1* | 6/2014 | Ezell | .................... | G02B 6/0016 362/608 |
| 2014/0261631 A1* | 9/2014 | Morgan | ............. | H01L 31/0525 136/246 |

* cited by examiner

ILLUMINATION APPARATUS, METHOD FOR MANUFACTURING LIGHT GUIDE PLATE, BACK LIGHT MODULE AND METHOD FOR MANUFACTURING THE SAME

CROSS-REFERENCE TO RELATED APPLICATION

This application is a continuation-in-part application of and claims the priority benefit of a prior application Ser. No. 13/911,102, filed on Jun. 6, 2013, now pending, which is a continuation-in-part application of and claims the priority benefit of a prior application Ser. No. 13/172,882, filed on Jun. 30, 2011, now patented as U.S. Pat. No. 8,480,286, which is a continuation-in-part application of and claims the priority benefit of U.S. patent application Ser. No. 12/464,104, filed on May 12, 2009, now patented as U.S. Pat. No. 7,997,784. The entirety of each of the above-mentioned patent applications is hereby incorporated by reference herein and made a part of this specification.

BACKGROUND OF THE INVENTION

1. Field of the Invention

The present invention generally relates to methods for manufacturing a light guide apparatus and a backlight module. More particularly, the present invention relates to methods for manufacturing a light guide apparatus and a backlight module having the light guide apparatus.

2. Description of Related Art

A light guide plate is a key part of a backlight module, and the way to produce a light guide plate includes injection, embossing and extrusion. In general, a light emitting diode (LED) or a light source are arranged on the edge of the light guide plate, and the light emitted by the LED or the light source comes out uniformly from the surface of the light guide plate.

In a backlight module, everything else is supportive of the light guide plate, for example, a back reflector, a diffuser, and brightness enhancement films such as prismatic films which disposed on the top of the light guide plate to help narrowing viewing angles, which makes the light brighter or collimated. For the backlight module, there are a lot more components other than the light guide plate, such as printed circuit board (PCB), flexible printed circuit board (FPC), LEDs, wires, connectors, housings, metal-stamped frames, labels, etc. However, everything is surrounding the heart of the backlight module, which is the light guide plate.

The cited references of the prior art are listed below and considered irrelevant: U.S. Pat. Nos. 8,338,849, 8,384,114, 8,384,121, 8,466,488, 8,511,883, 83,653,539, 8,680,567, US Pub. No. 2012/0170313, US Pub. No. 2012/0170317, US Pub. No. 2012/0327682, U.S. Pat. No. 8,573,827, U.S. Pat. No. 8,602,631, US Pub. No. 2012/0170318, US Pub. No. 2013/0128614.

However, the conventional backlight module is generally configured by providing LEDs onto a circuit board, and the LEDs are electrically connected with the circuit board, so as to form an LED array, and then assembling the LED array into a light source accommodating space of the backlight module. Accordingly, in fabricating such a backlight module, the LEDs must be previously welded to the circuit board. Then, the circuit board, together with the LEDs welded thereon, is secured to light source accommodating space of the backlight module. As such, the process of the fabrication is relatively complex, and needs a high fabrication cost.

SUMMARY OF THE INVENTION

Accordingly, the present invention is directed to methods for manufacturing a light guide apparatus and a back light module having the same, wherein the manufacturing process is simplified and the fabrication cost is also be reduced.

The present invention is directed to a backlight module fabricated by the method described above, such that the backlight module has higher fabrication efficiency and lower fabrication cost.

The present invention is directed to an illumination apparatus having the light guide apparatus, such that the illumination apparatus has higher fabrication efficiency and lower fabrication cost.

The present invention provides a method for manufacturing a light guide apparatus. The method includes the following steps. Firstly, a first mold and a second mold corresponding to the first mold are provided. The first mold includes a first molding surface and the second mold includes a second molding surface facing the first molding surface, wherein at least one protrusion is disposed at the first molding surface or the second molding surface. Then, a plurality of sheet materials are provided. Each of the sheet materials includes an opening corresponding to the protrusion, a first surface, a second surface opposite to the first surface and a circuit layer disposed on the first surface. Then, one of the sheet materials is disposed on the first mold, and the first surface faces the first mold. Next, the first mold and the second mold are closed, and the first molding surface and the second molding surface defining a containing space therebetween. Then, an optical plastic material is injected into the containing space to form a light guide plate having a via corresponding to the protrusion for embedding at least one light source, and the second surface of the one of the sheet materials located on the light guide plate.

The present invention provides a method for manufacturing a backlight module. The method includes the following steps. A first mold and a second mold corresponding to the first mold are provided. The first mold includes a first molding surface and the second mold includes a second molding surface facing the first molding surface, wherein at least one protrusion is disposed at the first molding surface or the second molding surface. Then, a plurality of sheet materials are provided. Each of the sheet materials includes an opening corresponding to the protrusion, a first surface, a second surface opposite to the first surface and a circuit layer disposed on the first surface. Then, one of the sheet materials is disposed on the first mold, and the first surface faces the first mold. Next, the first mold and the second mold are closed, and the first molding surface and the second molding surface defining a containing space therebetween. Then, an optical plastic material is injected into the containing space to form a light guide plate having a via corresponding to the protrusion for embedding at least one light source, and the second surface of the one of the sheet materials located on the light guide plate. Next, at least one light source is disposed in the via. Then, the light source and the circuit layer are electrically connected to each other by welding.

The present invention provides a backlight module. The backlight module includes a light guide apparatus produced by the method for manufacturing the light guide apparatus as claimed in claim 1 and at least one light source embedded in the via and electrically connected to the circuit layer.

The present invention provides an illumination apparatus. The illumination apparatus includes an illumination shell formed by a light guide plate, a sheet material having a circuit layer integrated with the light guide plate, a light source embedded in the light guide plate and electrically connected to the circuit layer and a heat dissipation layer disposed at the rear surface of the illumination shell, wherein the circuit layer is arranged on the front surface of the illumination shell. The illumination shell is in disc shape and adapted to be connected to a fixture.

According to an embodiment of the present invention, the method further includes the following steps. A robot arm is provided. The robot arm includes a first vacuuming cup and a second vacuuming cup. The first mold and the second mold are separated. Another one of the sheet materials is picked up by the first vacuuming cup. The light guide plate is taken away from the second mold by the second vacuuming cup. Said another one of the sheet materials is disposed on the first mold by the first vacuuming cup.

According to an embodiment of the present invention, wherein the sheet materials are formed in a roll, and the step of disposing the one of the sheet materials on the first mold includes: the sheet material roll is fed by a roller. The one of the sheet materials is located with the first mold by a positioning sensor.

According to an embodiment of the present invention, wherein the protrusion is disposed at the first molding surface, and the via defined by the protrusion is a blind via.

According to an embodiment of the present invention, wherein the protrusion is disposed at the second molding surface, and the via defined by the protrusion is a through hole.

According to an embodiment of the present invention, wherein each of the sheet materials further includes a heat dissipation layer disposed on the second surface.

According to an embodiment of the present invention, wherein each of the sheet materials further includes a reflective layer disposed on the second surface.

Based on the above-mentioned description, the present invention integrates a sheet material having a circuit layer with a light guide plate to form a light guide apparatus and a backlight module having the light guide apparatus. The sheet material is disposed on a first mold, wherein a protrusion is disposed at the first mold or the second mold. Then, the first mold and the second mold are closed, and an optical plastic material is then injected therebetween to form the light guide plate having a via corresponding to the protrusion. As such, light sources can be embedded in the via and electrically connected to the circuit later. Accordingly, the fabrication process of the light guide apparatus and the backlight module having the light guide apparatus can be simplified, and the fabrication cost thereof can also be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
FIG. 1A to FIG. 1E illustrate a manufacturing process of a light guide apparatus according to an embodiment of the invention.
Figure 1B:
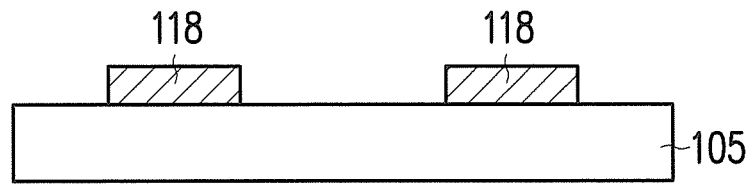

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", or "back", etc., is used with reference to the orientation of the Figure(s) being described. The components of the present invention can be positioned in a number of different orientations. As such, the directional terminology is used for purposes of illustration and is in no way limiting. The use of "including," "comprising," or "having" and variations thereof herein is meant to encompass the items listed thereafter and equivalents thereof as well as additional items. Unless limited otherwise, the teems "facing," "faces" and variations thereof herein are used broadly and encompass direct and indirect facing." Therefore, the description of "A" component facing "B" component herein may contain the situations that "A" component directly faces "B" component or one or more additional components are between "A" component and "B" component.

Reference will now be made in detail to the present preferred embodiments of the invention, examples of which are illustrated in the accompanying drawings. Wherever possible, the same reference numbers are used in the drawings and the description to refer to the same or like parts.

Figure 1C:
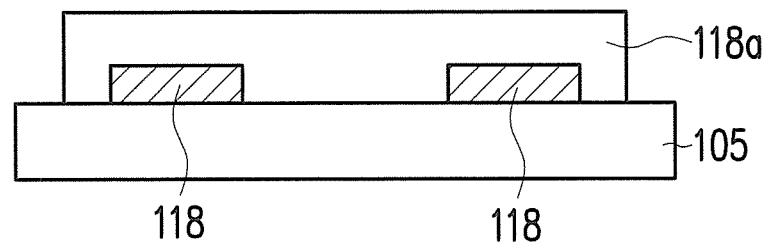
Figure 1D:
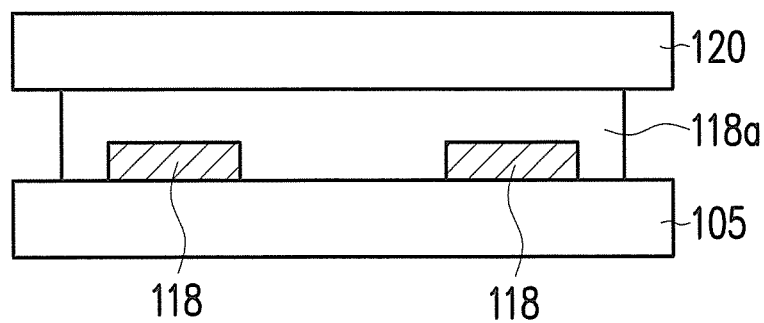
Figure 1E:
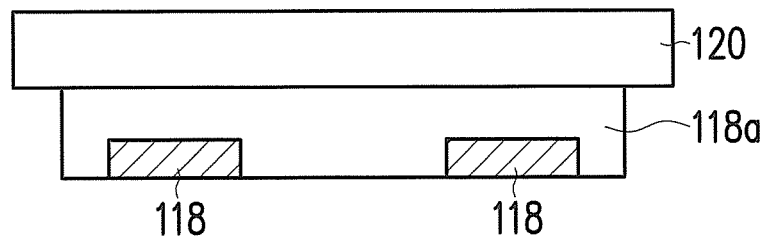

FIG. 1A to FIG. 1E illustrate a manufacturing process of a light guide apparatus according to an embodiment of the invention. In the present embodiment, the method for manufacturing a light guide apparatus may includes the following steps. Referring to both FIG. 1A and FIG. 1B, firstly, a substrate 105 as shown in FIG. 1A is provided. The substrate 105 may be a carrier having a smooth top surface. Then, a circuit layer 118 is formed on the smooth top surface of the substrate 105. Next, a functional layer 118a as shown in FIG. 1C is formed on the smooth top surface of the substrate 105 and covers the circuit layer 118. In the present embodiment, the functional layer 118a may be a reflective layer or a heat dissipation layer. Referring to FIG. 1D, a light guide plate 120 is then disposed on the functional layer 118a. In the present embodiment, the material of the light guide plate 120 may be transparent polymers such as polymethyl methacylate (PMMA), polycarbonate (PC), polystyrene and other optical polymers. The invention is not limited herein. Finally, the substrate 105 is removed, and the light guide apparatus as shown in FIG. 1E is formed. Owing to the smooth top surface of the substrate 105, the surfaces of the circuit layer 118 and the functional layer 118a formed thereon is also smooth, so that corona discharge can be prevented, and the circuit layer 118 can be formed on the light guide plate 120 without damaging the surface of the light guide plate 120. At least one light source may be then embedded in the light guide apparatus as shown in FIG. 1E and electrically connected to the circuit layer 118 to form a backlight module.

FIG. 2A to FIG. 2E illustrate a manufacturing process of a light guide apparatus and a backlight module according to an embodiment of the invention. In the present embodiment, the method for manufacturing a light guide apparatus and a backlight module having the light guide apparatus may includes the following steps. Firstly, referring to FIG. 2A, a first mold 200 and a second mold 300 corresponding to the first mold 200 are provided. In the present embodiment, the first mold 200 may be a cavity mold, and the second mold 300 may be a core mold, but the invention is not limited thereto. To be specific, the first mold 200 includes a first molding surface 210 and the second mold 300 includes a second molding surface 310 facing the first molding surface 210. At least one protrusion 350/250 is disposed at the first molding surface 210 or the second molding surface 310. In the present embodiment, the protrusion 350 disposed at the second molding surface 310 is firstly illustrated. Then, referring to FIG. 2B, a plurality of sheet materials 110 are provided, and one of the sheet materials 110 is disposed on the first mold 200. Each of the sheet materials 110 includes an opening 112 corresponding to the protrusion 350, a first surface 114, a second surface 116 opposite to the first surface 114 and a circuit layer 118 disposed on the first surface 114. The first surface 114 of the sheet material 110 disposed on the first mold 200 faces the first molding surface 210 of the first mold 200. In the present embodiment, the first molding surface 210 may include a plurality of concaves corresponding to the circuit layer 118 for accommodating the circuit layer 118 of the sheet material 110.

Figure 2A:
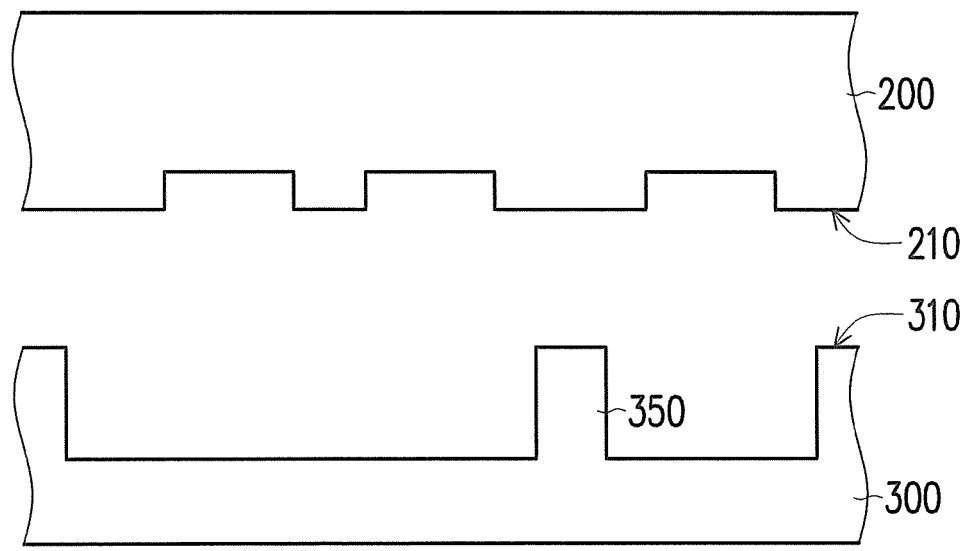
FIG. 2A to FIG. 2E illustrate a manufacturing process of a light guide apparatus and a backlight module according to an embodiment of the invention.
Figure 2B:
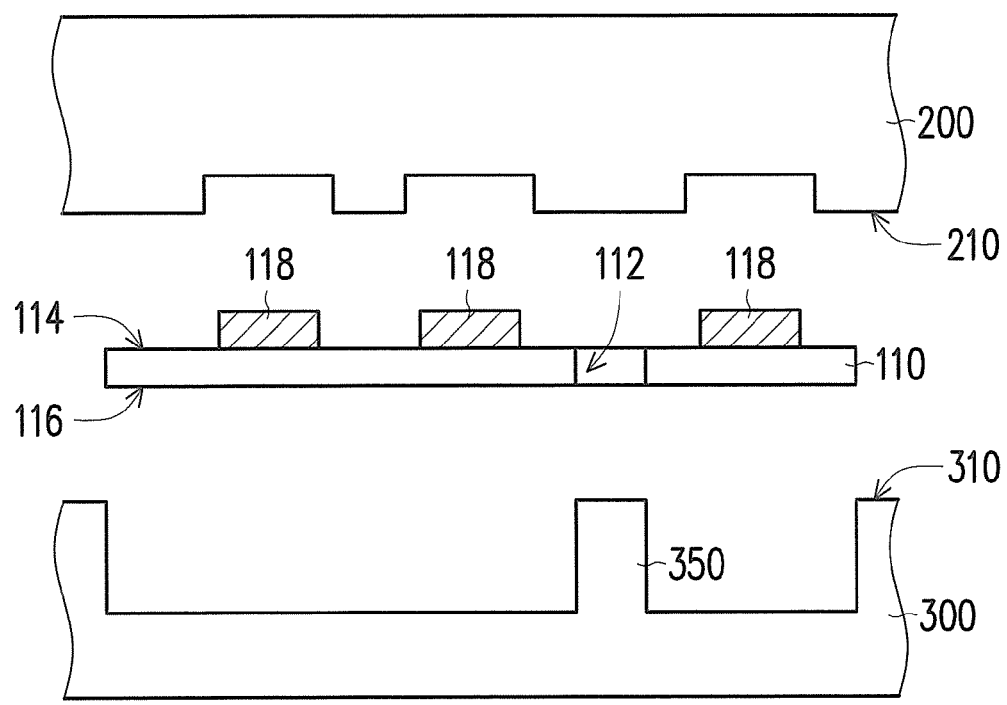
Figure 2C:
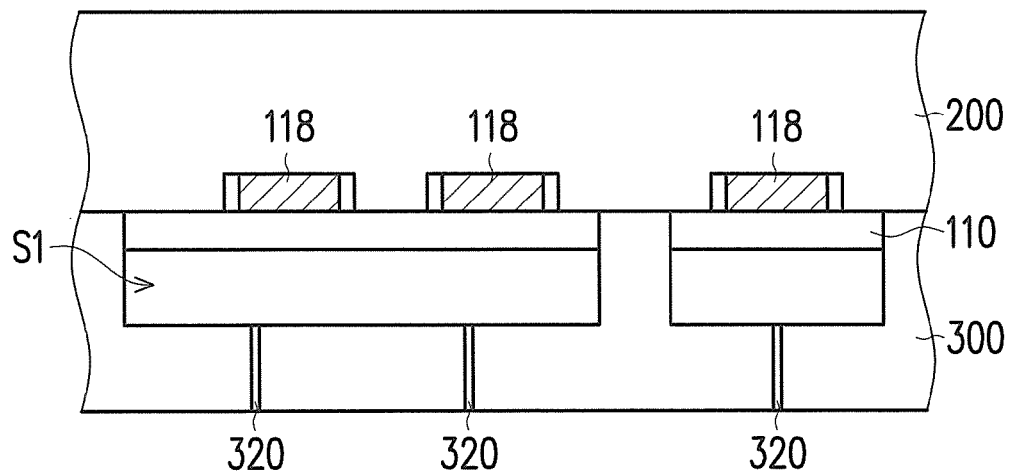
Figure 2D:
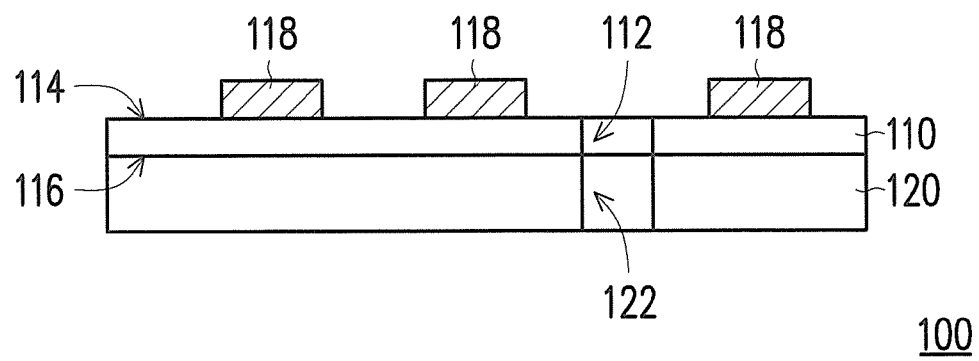

Then, referring to FIG. 2C, the first mold 200 and the second mold 300 are closed, such that the first molding surface 210, the sheet material 110 disposed thereon and the second molding surface 310 together define a containing space S1 therebetween. An optical plastic material is then injected into the containing space S1 to form a light guide plate 120, as shown in FIG. 2D, having a via 122 corresponding to the protrusion 350 for embedding at least one light source. To be more specific, after the optical plastic material is cured, the second mold 300 may adopt a plurality of poking pins 320 to poke the cured optical plastic material, such that the cured optical plastic material is separated from the second mold 300 to form the light guide plate 120 as shown in FIG. 2D, and the second surface 116 of the sheet material 110 is located on the light guide plate 120. As such, the sheet material 110 is laminated onto the light guide plate 120 by technique similar to In-Mold roller (IMR), In-Mold Decoration (IMD), or In-Mold Forming (IMF). In the present embodiment, the material of the light guide plate 120 may be transparent polymers such as polymethyl methacylate (PMMA), polycarbonate (PC), polystyrene and other optical polymers, and the molding temperature may range from 220° C. to 250° C., but, of course, the invention is not limited herein. The via 122 of the light guide plate 120 is a through hole for the protrusion 350 of the second mold 300 to penetrate therethrough. Thereby, a light guide apparatus 100 as shown in FIG. 2D including the sheet material 110 and the light guide plate 120 is formed.

Figure 2E:
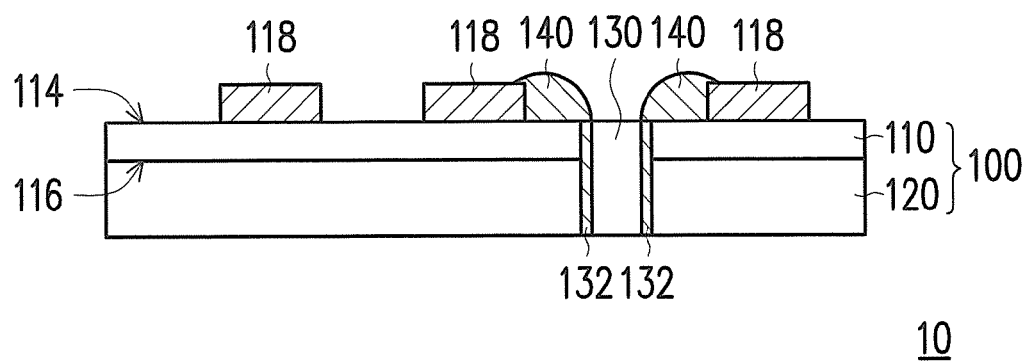

Referring to both FIG. 2D and FIG. 2E, to form a backlight module 10 having the light guide apparatus 100, at least one light source 130 as shown in FIG. 2E may then be disposed in the opening 112 and the via 122 shown in FIG. 2D. The light source 130 may include conductive layers 132, and a welding process may be performed thereon so the conductive layers 132 of the light source 130 and the circuit layer 118 of the light guide apparatus 100 are electrically connected to each other. Thereby, the backlight module 10 having the light guide apparatus 100 is formed.

Figure 3:
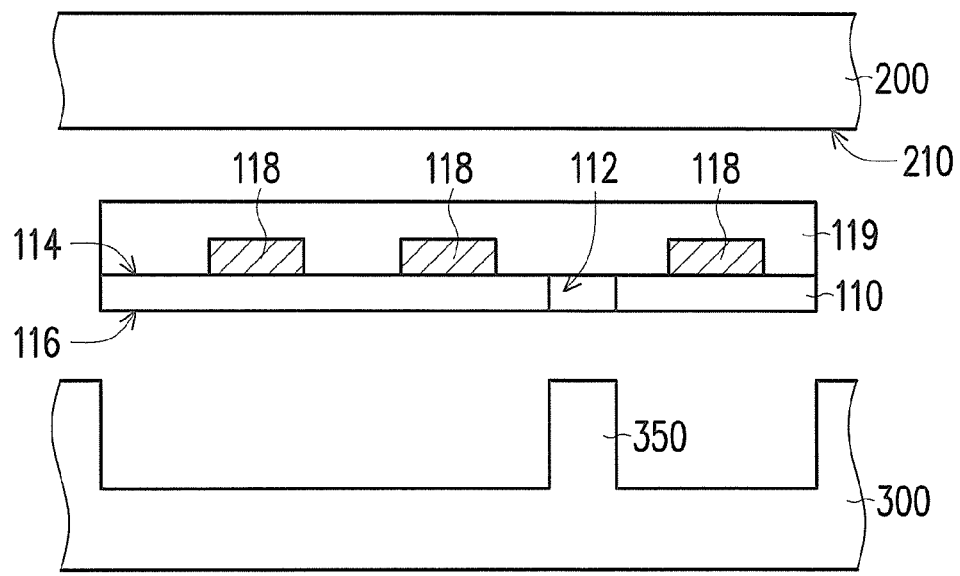
FIG. 3 illustrates a manufacturing process of a light guide apparatus and a backlight module according to another embodiment of the invention.

FIG. 3 illustrates a manufacturing process of a light guide apparatus and a backlight module according to another embodiment of the invention. Referring to FIG. 3, in the present embodiment, the sheet material 110 may further include a cover layer 119 disposed on the first surface 114 and covering the circuit layer 118 as shown in FIG. 3. As such, the top surface of the sheet material 110 is a flat surface, so the first molding surface 210 of the first mold 200 shown in FIG. 3 may also be a flat surface without having cavities corresponding to the circuit layer 118.

Figure 4A:
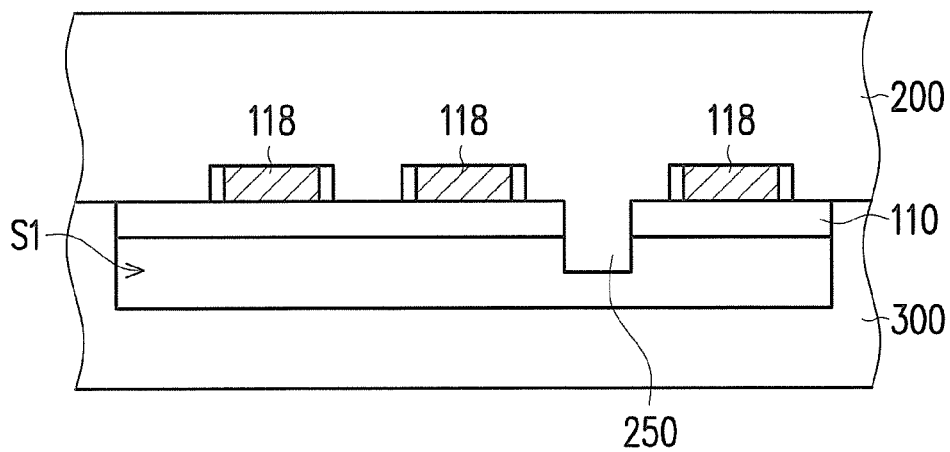
FIG. 4A to FIG. 4C illustrate a manufacturing process of a light guide apparatus and a backlight module according to another embodiment of the invention.
Figure 4B:
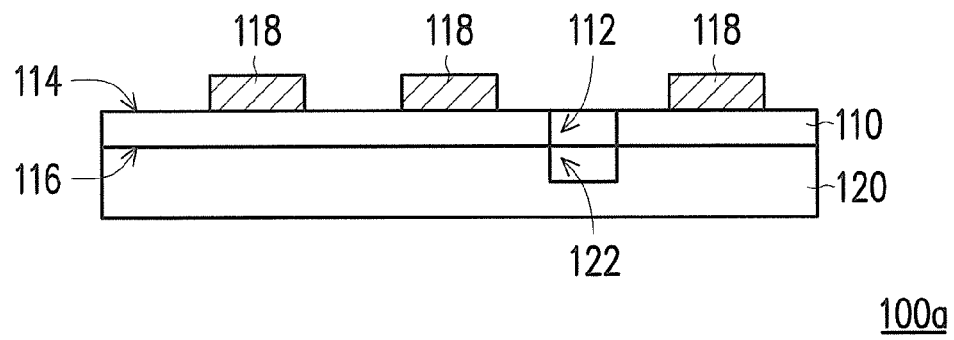
Figure 4C:
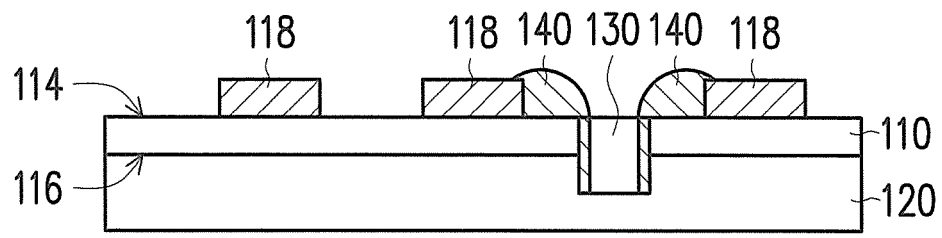

FIG. 4A to FIG. 4C illustrate a manufacturing process of a light guide apparatus and a backlight module according to another embodiment of the invention. In the present embodiment, the protrusion 250 is disposed on the first molding surface 210 of the first mold 200 as shown in FIG. 4A. In this scenario, when the first mold 200 and the second mold 300 are closed, the protrusion 250 does not need to penetrate all the way through the light guide plate 120 to form the through hole 122 as shown in FIG. 2D, but just to form a blind via 122 as shown in FIG. 4B for embedding the light source. In other words, when the protrusion 350 is disposed at the second molding surface 310 as shown in FIG. 2C, the via 122 defined by the protrusion 350 is a through hole as shown in FIG. 2D, and when the protrusion 250 is disposed at the first molding surface 210 as shown in FIG. 4A, the via 122 defined by the protrusion 250 is a blind via as shown in FIG. 4B.

Figure 5A:
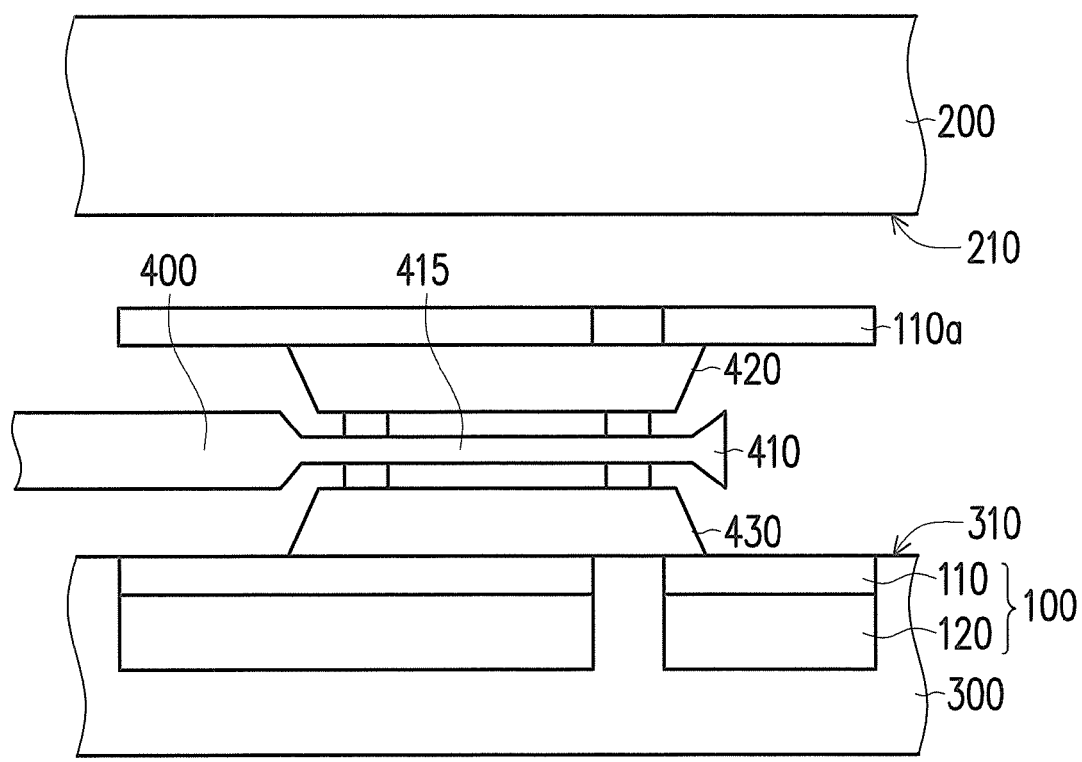
FIG. 5A to FIG. 5B illustrate a manufacturing process of a light guide apparatus and a backlight module according to another embodiment of the invention.
Figure 5B:
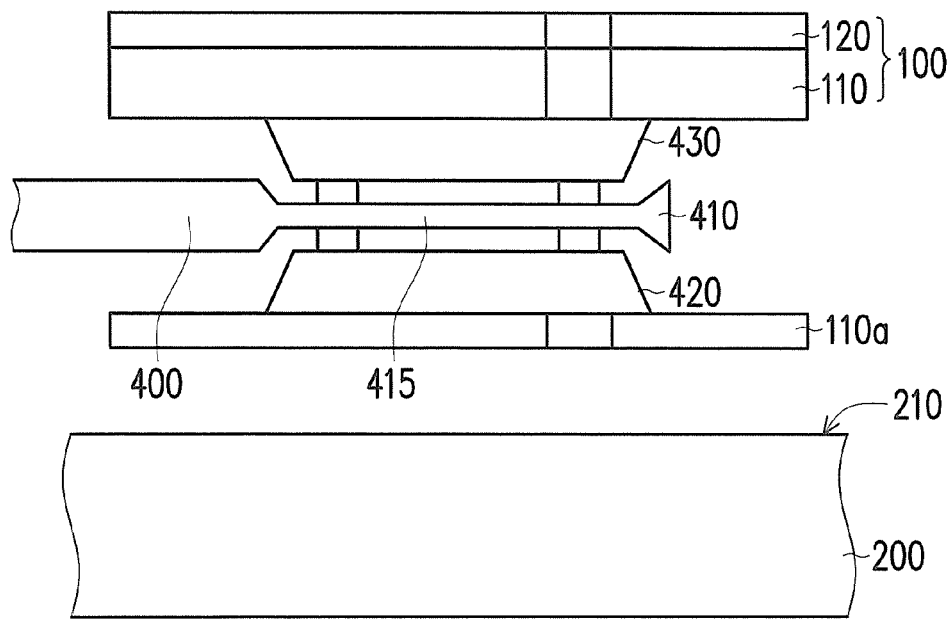

FIG. 5A to FIG. 5B illustrate a manufacturing process of a light guide apparatus and a backlight module according to another embodiment of the invention. In the present embodiment, a robot arm 400 including a first vacuuming cup 420 and a second vacuuming cup 430 as shown in FIG. 5A may be provided to dispose the sheet material 110 on the first mold 200. To be more specific, the robot arm 400 may include a rotating wrist 410 and a vacuuming portion 415 disposed on the rotating wrist 410. The vacuuming portion 415 includes the first vacuuming cup 420 and the second vacuuming cup 430. In the present embodiment, the first vacuuming cup 420 and the second vacuuming cup 430 are disposed opposite to each other as shown in FIG. 5A, but the invention is not limited thereto. With the configuration, when the optical plastic material is cured and the first mold 200 and the second mold 300 are separated, the robot arm 400 is controlled to take another one of the sheet materials 110a by the first vacuuming cup 420. Then, the light guide apparatus 100 is taken away from the second mold 300 by the second vacuuming cup. To be more specific, the rotating wrist 410 may be rotated to make the second vacuuming cup 430 facing the second mold 300, so as to dispose the newly formed light guide apparatus 100 on the second vacuuming cup 430 and take the newly formed light guide apparatus 100 away from the second mold 300. Then, said another one of the sheet materials 110a is disposed on the first mold 200 by the first vacuuming cup 420. In detail, the rotating wrist 410 may be rotated to place the sheet material 110a on the first mold 200 as shown in FIG. 5B. Thereby, after the light guide apparatus 100 having the light guide plate 120 and the sheet material 110 is formed, another sheet material 110a can be placed on the first mold 200 by the robot arm 400, so as to perform the manufacturing process of the light guide apparatus continuously.

Figure 6:
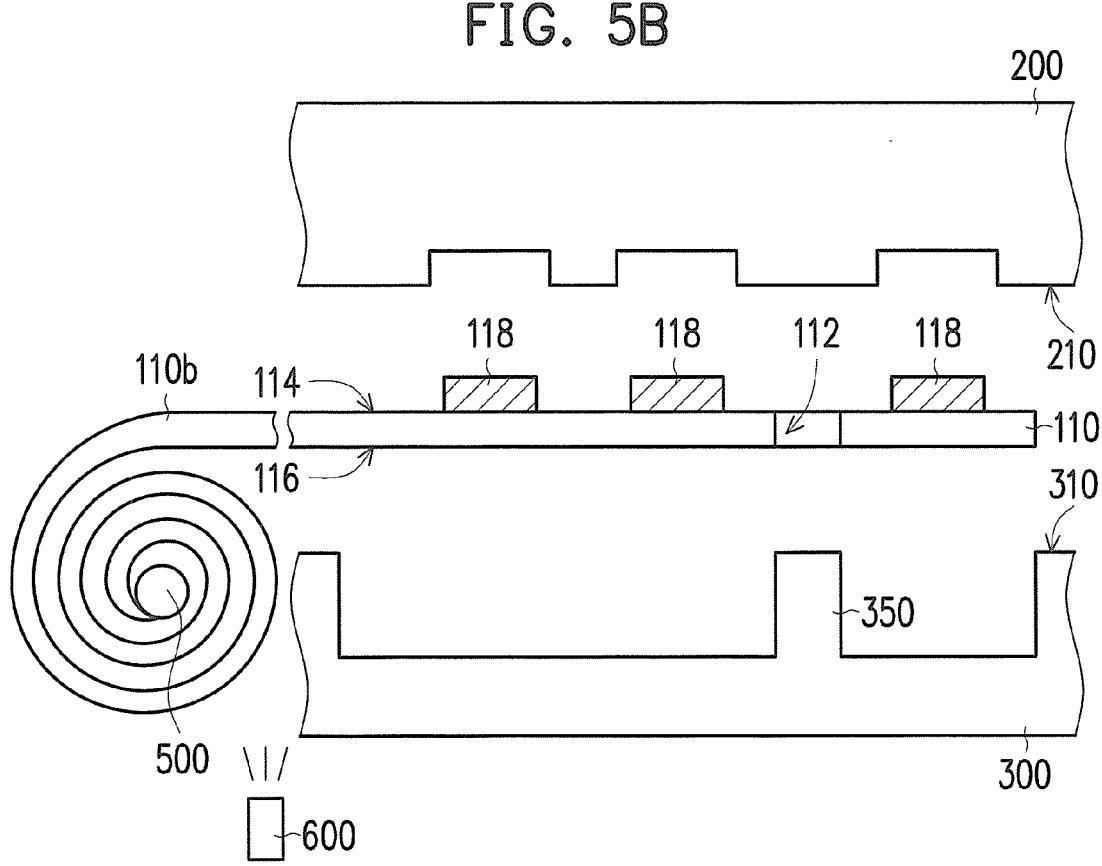
FIG. 6 illustrates a manufacturing process of a light guide apparatus and a backlight module according to another embodiment of the invention.

FIG. 6 illustrates a manufacturing process of a light guide apparatus and a backlight module according to another embodiment of the invention. In the present embodiment, the sheet materials 110 are formed in a roll 110b. In other words, multiple sheet materials 110 may be connected to each other and rolled into a roll 110b, and one end of the roll 110b is connected to a roller 500 as shown in FIG. 6. Moreover, a positioning sensor 600 is configured for sensing the position of the roll 110b. With the configuration, the one of the sheet materials 110 of the roll 110b is fed by the roller 500, and the one of the sheet materials 110 is located with the first mold 200 by the positioning sensor 600. In detail, the roller 500 drives the roll 110b to rotate, such that another end of the roll 110b is moved forward. When the positioning sensor 600 senses that the one of the sheet material 110 of the roll 110b is moved to be located on the first mold 200 as shown in FIG. 6, the positioning sensor 600 may send a signal to stop the roller 500 from keep rolling. Thereby, the sheet material 110 is placed on the first mold 200 for the following manufacturing process. After the light guide apparatus 100 having the light guide plate 120 and the sheet material 110 is formed, the roller 500 is driven to move the next sheet material 110 of the sheet material roll 110b to be located on the first mold, so as to perform the manufacturing process of the light guide apparatus continuously.

Figure 7:
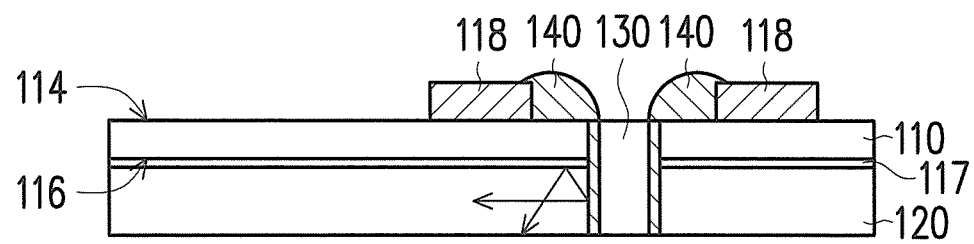
FIG. 7 illustrates a backlight module according to an embodiment of the invention.
Figure 8:
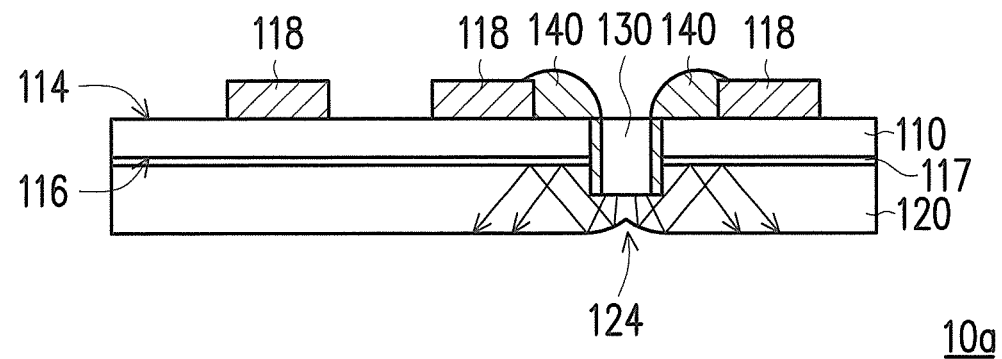
FIG. 8 illustrates a backlight module according to another embodiment of the invention.

FIG. 7 illustrates a backlight module according to an embodiment of the invention. FIG. 8 illustrates a backlight module according to another embodiment of the invention. Firstly referring to FIG. 7, after performing the manufacturing process described above, the backlight module 10 as shown in FIG. 7 is formed. The backlight module 10 may include the light guide apparatus 100 as shown in FIG. 2D or FIG. 4B and at least one light source 130 embedded in the via 122 of the light guide apparatus 100, and the light source 130 is electrically connected to the circuit layer 118 of the sheet material 110. In addition, the sheet material 110 may further include a heat dissipation layer and/or a reflective layer 117 disposed on the second surface 116 of the sheet material 110. In the present embodiment, the backlight module 10 shown in FIG. 7 may be the side-in type backlight module, which means the light-emitting surface of the light source 130 facing the side surface of the via 122, so the light emitted by the light source 130 enters the light guide plate 120 by the side thereof. Referring to FIG. 8, in the present embodiment, the backlight module 10a may be the face-in type backlight module, which means the light-emitting surface of the light source 130 facing the bottom surface of the via 122, and a bottom surface of the light guide plate 120 may includes some micro structures 124 to help distributing the light emitted by the light source 130. In this case, the second molding surface of the second mold for forming the light guide plate 120 may further include some patterns to be printed on the corresponding surface of the light guide plate 120, so as to form micro structures 124 on the bottom surface of the light guide plate 120.

Figure 9:
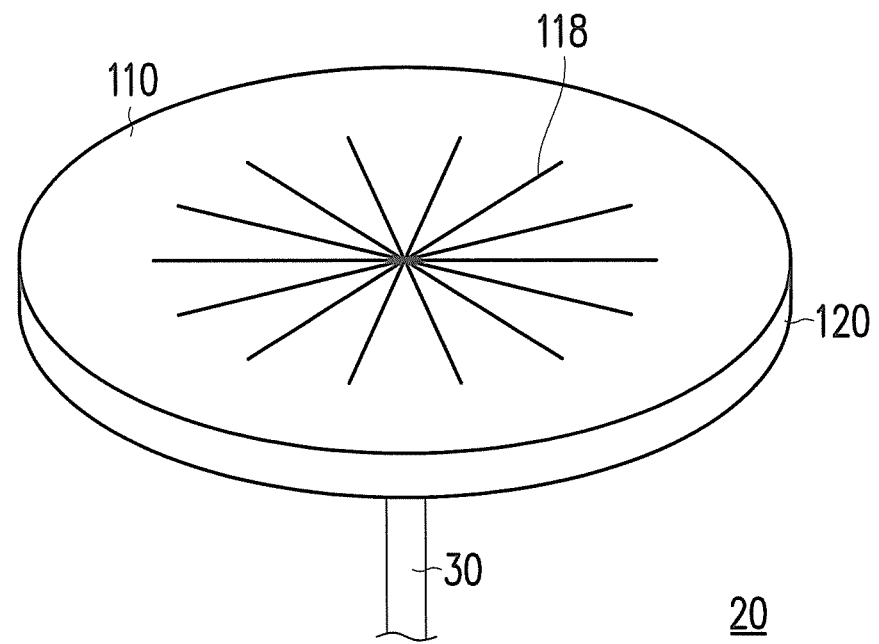
FIG. 9 illustrates an illumination apparatus according to an embodiment of the invention.
Figure 10:
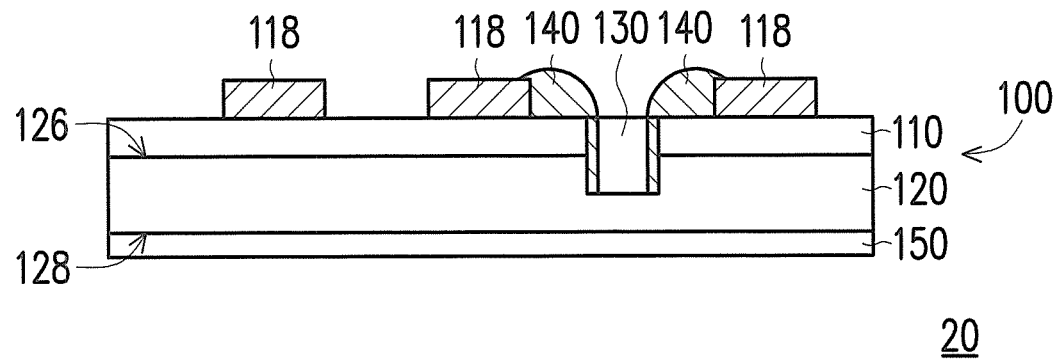
FIG. 10 illustrates a cross-sectional view of the illumination apparatus in FIG. 9.

FIG. 9 illustrates an illumination apparatus according to an embodiment of the invention. FIG. 10 illustrates a cross-sectional view of the illumination apparatus in FIG. 9. Referring to both FIG. 9 and FIG. 10, in the present embodiment, the light guide apparatus 100 described above may be applicable to an illumination apparatus 20 as shown in FIG. 9. The illumination apparatus 20 may include an illumination shell 120, a sheet material 110, at least one light source 130 and a heat dissipation layer 150. The illumination shell 120 may be formed by the light guide plate 120 as shown in FIG. 2D or FIG. 4B. The illumination shell 120 is in disc shape and adapted to be connected to a fixture 30 as shown in FIG. 9. As such, the illumination apparatus 20 may be fixed to, for example, a ceiling, etc., via the fixture 30 for decoration or illumination purpose. For instance, the illumination apparatus 20 may be a ceiling round light. The sheet material 110 herein may be the sheet material 110 as shown in FIG. 2D and FIG. 4B, which includes a circuit layer 118. The sheet material 110 is integrated with the light guide plate 120 by technique similar to In-Mold roller (IMR), In-Mold Decoration (IMD), or In-Mold Forming (IMF). Thereby, the circuit layer 118 are distributed over a front surface 126 of the disc-shaped illumination shell 120, and the fixture 30 may be connected to a rear surface 128 of the disc-shaped illumination shell 120, but the invention is not limited thereto. In the present embodiment, the circuit layer 118 are arranged to form a pattern having many radial lines extend from the center to the edge of the front surface of the disc-shaped illumination shell 120 in FIG. 9. The light source 130 is embedded in the illumination shell 120 and electrically connected to the circuit layer 118 by welding. The material of the circuit layer 118 may be light-transmitting material, for example, indium tin oxide (ITO) for aesthetic reasons, and the illumination apparatus 20 in disc shape can be evenly illuminated.

In addition, the heat dissipation layer 150 is disposed at the rear surface 128 of the illumination shell 120 for dissipating the heat generated by the light sources 130 of the illumination apparatus 20, so the illumination apparatus 20 can have better heat dissipating efficiency. The heat dissipation layer 150 can be achieved by painting a copper thin film on the rear surface 128 of the illumination shell 120. The circuit layer 118 on the sheet material 110 integrated with the illumination shell 120 are distributed over the front surface 126 of the disc-shaped illumination shell 120, such that the illumination apparatus 20 in disc shape can be evenly illuminated.

In sum, the present invention integrates a sheet material having a circuit layer with a light guide plate to form a light guide apparatus and a backlight module having the light guide apparatus. The sheet material is disposed on a first mold, wherein a protrusion is disposed at the first mold or the second mold. Then, the first mold and the second mold are closed, and an optical plastic material is then injected therebetween to form the light guide plate having a via corresponding to the protrusion. As such, light sources can be embedded in the via and electrically connected to the circuit later. Accordingly, the fabrication process of the light guide apparatus and the backlight module having the light guide apparatus can be simplified, and the fabrication cost thereof can also be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a light guide apparatus, comprising:
provided a first mold and a second mold corresponding to the first mold, the first mold comprising a first molding surface and the second mold comprising a second molding surface facing the first molding surface, wherein at least one protrusion is disposed at the first molding surface or the second molding surface;
providing a plurality of sheet materials, each of the sheet materials comprising an opening corresponding to the protrusion, a first surface, a second surface opposite to the first surface and a circuit layer disposed on the first surface;

disposing one of the sheet materials on the first mold, and the first surface facing the first mold;

closing the first mold and the second mold, and the first molding surface and the second molding surface defining a containing space therebetween; and injecting an optical plastic material into the containing space to form a light guide plate having a via corresponding to the protrusion for embedding at least one light source, and the second surface of the one of the sheet materials disposed on the light guide plate to form the light guide apparatus.

2. The method for manufacturing the light guide apparatus in claim 1, further comprising:

providing a robot arm comprising a first vacuuming cup and a second vacuuming cup;

separating the first mold and the second mold;

using the first vacuuming cup to pick another one of the sheet materials;

using the second vacuuming cup to take the light guide apparatus away from the second mold; and using the first vacuuming cup to dispose said another one of the sheet materials on the first mold.

3. The method for manufacturing the light guide apparatus in claim 1, wherein the sheet materials are formed in a roll, and the step of disposing the one of the sheet materials on the first mold comprising:

feeding the one of the sheet materials by a roller; and using a positioning sensor to locate the one of the sheet materials with the first mold.

4. The method for manufacturing the light guide apparatus in claim 1, wherein the protrusion is disposed at the first molding surface, and the via defined by the protrusion is a blind via.

5. The method for manufacturing the light guide apparatus in claim 1, wherein the protrusion is disposed at the second molding surface, and the via defined by the protrusion is a through hole.

6. The method for manufacturing the light guide apparatus in claim 1, wherein each of the sheet materials further comprising a heat dissipation layer disposed on the second surface.

7. The method for manufacturing the light guide apparatus in claim 1, wherein each of the sheet materials further comprising a reflective layer disposed on the second surface.

8. A method for manufacturing a backlight module, comprising:

providing a first mold and a second mold corresponding to the first mold, the first mold comprising a first molding surface and the second mold comprising a second molding surface facing the first molding surface, wherein at least one protrusion is disposed at the first molding surface or the second molding surface;

providing a plurality of sheet materials, each of the sheet materials comprising an opening corresponding to the protrusion, a first surface, a second surface opposite to the first surface and a circuit layer disposed on the first surface;

disposing one of the sheet materials on the first mold, and the first surface facing the first mold; and closing the first mold with the second mold, and the first molding surface and the second molding surface defining a containing space therebetween;

injecting an optical plastic material into the containing space to form a light guide plate having a via corresponding to the protrusion for embedding at least one light source, and the second surface of the one of the sheet materials located on the light guide plate;

disposing at least one light source in the via; and welding to electrically connect the light source and the circuit layer.

9. The method for manufacturing the backlight module in claim 8, further comprising:

providing a robot arm comprising a first vacuuming cup and a second vacuuming cup;

separating the first mold and the second mold;

using the first vacuuming cup to pick another one of the sheet materials;

using the second vacuuming cup to take the light guide plate away from the second mold; and using the first vacuuming cup to disposed said another one of the sheet materials on the first mold.

10. The method for manufacturing the backlight module in claim 8, wherein the sheet materials are formed in a roll, and the step of disposing the one of the sheet materials on the first mold comprising:

feeding the one of the sheet materials by a roller; and using a positioning sensor to locate the one of the sheet materials with the first mold.

11. The method for manufacturing the backlight module in claim 8, wherein the protrusion is disposed at the first molding surface, and the via defined by the protrusion is a blind via.

12. The method for manufacturing the backlight module in claim 8, wherein the protrusion is disposed at the second molding surface, and the via defined by the protrusion is a through hole.

13. The method for manufacturing the backlight module in claim 8, wherein each of the sheet materials further comprising a heat dissipation layer disposed on the second surface.

14. The method for manufacturing the backlight module in claim 8, wherein each of the sheet materials further comprising a reflective layer disposed on the second surface.

15. A backlight module, comprising:

a light guide apparatus produced by the method for manufacturing the light guide apparatus as claimed in claim 1; and at least one light source embedded in the via and electrically connected to the circuit layer.

16. The backlight module as claimed in claim 15, further comprising a heat dissipation layer disposed on the second surface of the sheet material.

17. The backlight module as claimed in claim 15, further comprising reflective layer disposed on the second surface of the sheet material.

18. An illumination apparatus comprising:

an illumination shell formed by a light guide plate, wherein the illumination shell is in disc shape and adapted to be connected to a fixture;

a sheet material having a circuit layer integrated with the light guide plate; and a light source embedded in the illumination shell and electrically connected to the circuit layer; and a heat dissipation layer disposed at a rear surface of the illumination shell, and the circuit layer arranged on a front surface of the illumination shell.

* * * * *